United States Patent [19]

Amberkar et al.

[11] 4,188,197
[45] Feb. 12, 1980

[54] PARTICULATE FILTERING

[75] Inventors: Suresh D. Amberkar, Framingham, Mass.; Elwood F. Hansen; David E. Hansen, both of Allendale, N.J.

[73] Assignee: Dennison Manufacturing Company, Framingham, Mass.

[21] Appl. No.: 839,048

[22] Filed: Oct. 3, 1977

Related U.S. Application Data

[63] Continuation of Ser. No. 616,524, Sep. 25, 1975, abandoned.

[51] Int. Cl.² ............................................. B01D 46/02
[52] U.S. Cl. ........................................ 55/382; 55/487;
55/DIG. 2; 210/505
[58] Field of Search ................. 55/381, 382, 486, 487,
55/527, 528, DIG. 2, DIG. 16; 210/503, 505;
428/218, 285, 296

[56] References Cited

U.S. PATENT DOCUMENTS

| | | | |
|---|---|---|---|
| 2,692,654 | 10/1954 | Pryor | 55/487 |
| 2,804,166 | 8/1957 | Stevens et al. | 55/382 |
| 2,888,095 | 5/1959 | Perrini et al. | 55/DIG. 16 |
| 3,208,205 | 9/1965 | Harms et al. | 55/487 |
| 3,251,495 | 5/1966 | Till et al. | 55/527 |
| 3,273,321 | 9/1966 | Bauder et al. | 55/528 |
| 3,307,332 | 3/1967 | Grace et al. | 55/DIG. 16 |
| 3,570,224 | 3/1971 | Clemens | 55/382 |
| 3,630,700 | 12/1971 | Hammel | 55/DIG. 16 |

FOREIGN PATENT DOCUMENTS

| | | | |
|---|---|---|---|
| 218185 | 8/1958 | Australia | 55/487 |
| 1958494 | 5/1971 | Fed. Rep. of Germany | 55/486 |
| 2503615 | 7/1975 | Fed. Rep. of Germany | 55/487 |
| 309965 | 11/1971 | U.S.S.R. | 55/487 |

OTHER PUBLICATIONS

For Compressed Air 400,000 Times Cleaner Than the Air We Breathe, Filtration & Separation, May/Jun., 1973, p. 301.
It's Paper—Sheet-fabric—It's Spun Bonded, Modern Plastic, Apr. 1968, pp. 93-96.

Primary Examiner—David L. Lacey
Attorney, Agent, or Firm—George E. Kersey

[57] ABSTRACT

A filter bag for dry copiers, i.e. copiers which employ particulate toner material. The bag comprises a filter element and a protective cover of porous non-woven material which imparts negligible resistance to air flow.

10 Claims, 8 Drawing Figures

PARTICULATE FILTERING

This is a continuation, of Ser. No. 616,524, filed Sept. 25, 1975, now abandoned.

BACKGROUND

This invention relates to the filtering of micro-particulate matter, i.e. matter having dimensions in the micron range, and more particularly to the filtering of dry toner particles.

In certain kinds of photocopiers, particulate matter, known as "dry toner" and ranging in size from about 1 to 40 microns, is used to form visible images. During this process dust is created which requires filtering.

The filters that are in common use typically employ a porous material and are relatively fragile. Consequently the filters often become damaged during shipment and installation.

Although consideration has been given to the use of a protective layer with such a filter, it has been generally assumed that this would interfere with proper filter functioning.

In addition the filters that are commonly employed for the removal of particulate matter of micron size in, for example, dry toner copier machines, do not provide efficient filtering. They allow a great deal of effluent to pass and they have a tendency to become clogged with particles after only limited usage. As a result, frequent replacement of the filters is necessary.

Moreover the tendency of conventional filters to become clogged after only short usage tends to subject the associated fans to irregular loading. When the filter is first installed and in a relatively unclogged condition air flows through it freely, but as the filter becomes filled with particles, the passage of air is impeded and the work load on the fan is significantly increased. This irregular loading causes both equipment and maintenance problems.

Accordingly, it is an object of the invention to realize a filter system which is suitable for removing the entire range of particulate matter encountered in the use of small size particles, especially those in the micron range.

Another object of the invention is to achieve a relatively durable particulate filter which is less likely to become damaged during shipment and installation.

Still another object of the invention is to improve the loading characteristics of filters so that the life of the filter can be extended considerably beyond the level at which conventional filters become so clogged and unsuitable for further filtering.

A related object is to reduce the maintenance interval during which filter replacement is necessary in order to assure satisfactory performance of machines in which particulate matter is used, especially that in the micron range. Another related object is to achieve a particulate filter which exhibits a substantially uniform loading characteristic over a period of extended use. A further related object is to provide for uniform loading on the equipment used in the filtering of particulate matter of micron size.

Yet another object is to significantly reduce toner effluent in a copier filter system.

SUMMARY OF THE INVENTION

In accomplishing the foregoing and related objects the invention provides for surrounding the filter medium with a porous shield that constitutes a protective member. The porous shield is advantageously a spun bonded filamentous material, such as that provided by nylon or polyester fibers. It unexpectedly imparts a negligible resistance to airflow, while simultaneously providing a desired reinforcement for the more delicate underlying filter that it protects.

The filter medium is advantageously of non-woven material and constitutes a loose fibrous mass. In accordance with one aspect of the invention the filter medium comprises a multiple layering of filter materials, which desirably has three elements with different levels of coarseness. The first element is advantageously of multistage or multiply fiber glass and constitutes a prefiltering medium of relatively coarse funnel-like porosity. The second element is advantageously of multidenier polyester fibers and is of medium porosity, while the third element is advantageously of microglass fibers and constitutes a relatively fine filter.

The fibers of the various elements, beginning with the air entry stage, become progressively finer in successive stages. This achieves a staged capture of particles of successively reduced average size without causing a bridging particle effect that would otherwise clog the filter and shorten its life.

The first or prefilter element is desirably in, partially compressed form with a mass of less than 500 grams per cubic foot. It has an internal surface area for the deposition of particles that is greater than the accessible internal surface area of the second or main filter element. The prefilter is advantageously in multi-ply form and is constructed to be essentially non-clogging throughout its life. In addition to being in the form of loose packing, the prefilter may also constitute a coherent front element of the filter inlet. In addition to fiber glass, polypropylene and polyesters are suitable materials. The thickness of the prefilter material desirably ranges from 1 to 15 denier with a preferred range from 3 to 6 denier. The prefilter is desirably in two plys, with the first ply that encounters the air stream having a lower denier than the second ply. This creates a desired funneling effect.

The second or main filter element is desirably a layer of high strength synthetic fiber from one-half to two inches in thickness, preferably being one inch in thickness and a blend of fibers of different thicknesses, e.g., 6 and 25 denier.

While the high strength fiber layer of the main filter may be used as a sole cover for the prefilter, it is advantageously backed by a third filter element in the form of a layer of resin bonded glass fibers of less than one inch in thickness, preferably about 0.5 inch.

When used, the porous shield, which may be of synthetic or natural fibers, reinforces and protects the microglass layer from damage during installation and handling. It has been discovered that this shield does not detract from performance, as would normally be expected from the imposition of an additional air flow impedance. The microglass layer has relatively short fibers which are significantly reinforced by being desirably bonded to the much longer, continuous fibers of the porous shield.

DESCRIPTION OF THE DRAWINGS

Other aspects of the invention will become apparent after considering several illustrative embodiments taken in conjunction with the drawings in which.

DETAILED DESCRIPTION

Figure 1:
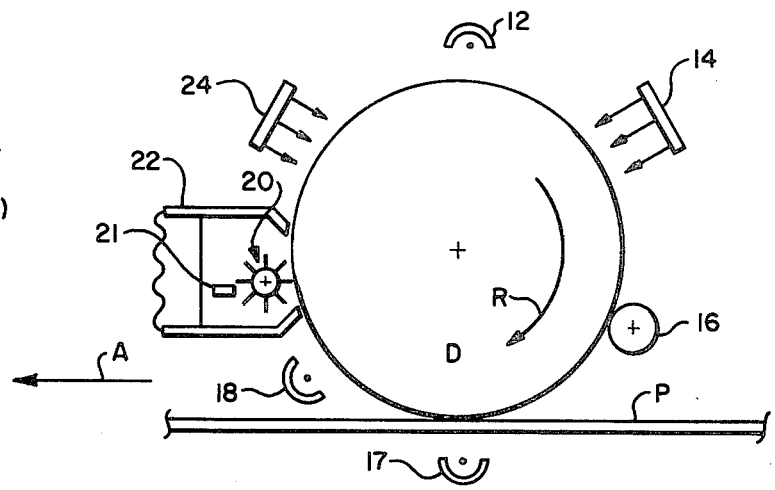
FIG. 1 is a diagram of an illustrative copying machine for use with the invention.

Referring now to FIG. 1, an illustrative setting for the invention is provided by a representative copying machine, which includes a feeder (not shown) for moving paper P with respect to a photosensitive drum D that rotates in the direction indicated by an arrow R. During each operating cycle, the photosensitive drum D is first charged by an electric discharge corona 12 and exposed to an optical image at position 14 to provide an electrostatic counterpart image on the drum. Dry toner particles are then applied by a magnetic brush 16 to provide a charged particle image on the drum. This is followed by transfer of the charged particles to the paper P by the attractive effect of a corona discharge 17. Residual toner particles remaining on the drum are loosened by an alternating current corona 18 and are removed by contact with a brush 20. Exposure to a light source 24 then erases any residual charges on the drum and moves past the charging corona 12 to initiate a new cycle of operation.

Figure 2:
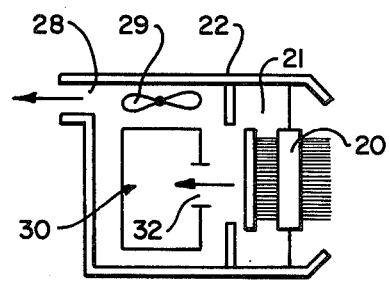
FIG. 2 is a top view of a filter housing for the machine of FIG. 1.

The particle removing brush 20 is contained in a housing 22 that is shown in further detail in the top view of FIG. 2. The housing 22 includes a flicker bar 21 to clean the brush and a filter bag 30 that is positioned to receive an air stream with entrained toner particles that have been flicked from the brush 20 by the bar 21. As the particle laden air stream is pumped to the exhaust 28 by a fan 29 the particles are trapped in the bag 30.

Figure 3:
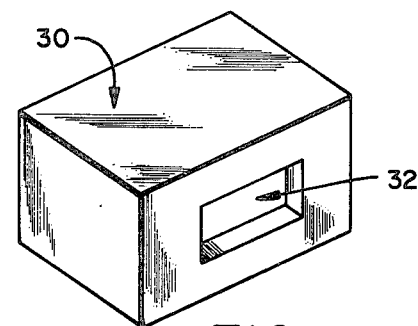
FIG. 3 is a perspective view of a filter bag for use in the housing of FIG. 2.

FIG. 3 shows the bag 30 in isometric form, including its entrance 32, which may be cut away without reinforcement, or may be reinforced with a stapled cardboard lip.

Figure 4:
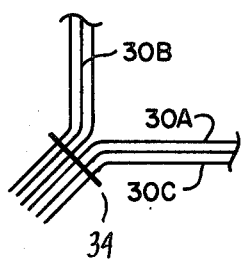
FIG. 4 is a diagram showing constructional details for the filter bag of FIG. 3.

FIG. 4 shows constructional details for the bag 30 with the walls formed by elements 30A, 30B and 30C butted at adjacent marginal portions and secured by a line of stapling 34.

Figure 5:
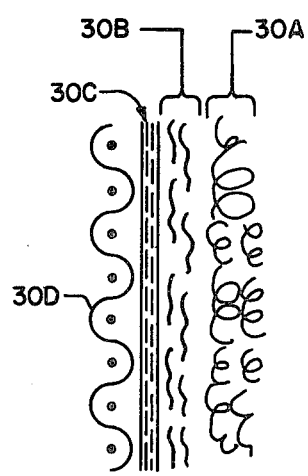
FIG. 5 is a cross-sectional view showing wall details of a filter bag in accordance with the invention.
Figure 6:
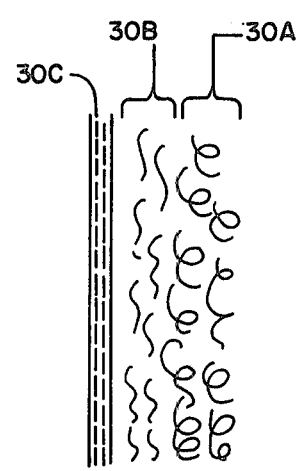
FIG. 6 is another embodiment showing wall details of a filter bag in accordance with the invention.

Further details for two different kinds of wall construction according to the invention are illustrated in FIGS. 5 and 6. In both, an inside frontal element 30A constitutes a prefiltering medium, with the main filter being formed by an intermediate element 30B that is backed by an outer microglass fiber element 30C. The embodiment of FIG. 5 includes a further protective scrim element 30D that is provided to avoid damage to the microglass element 30C during packing and installation.

A preferred construction of the elements is as follows:

The first or prefiltering element 30A is desirably formed by DRICO type number 1072C1 puff expanded, two ply or two layer fiberglass that is compressed to a thickness one inch from its nominal uncompressed thickness of two inches. The element 30A has long, continuous thermosetting fiberglass fibers arranged in a pattern which provides an open and resilient non-clogging entry face layer, and a denser departure face layer for air leaving the layer.

The second or intermediate element 30B is desirably a one-inch thick, non-woven blend of 75 weight percent, 6 denier, polyester fibers and twenty-five percent, 25 denier, polyester fibers. It has a weight of about 6.0 ounces per square yard.

The third or outer element 30C is desirably of 0.5 inch thick borosilicate micro glass fibers in felt bonded with bunolic resin. The weight is about 11 grams per square foot and the glass fibers have a diameter of about 0.00016 inch.

Finally, the protective element 30D is desirably a spun bonded reinforcing sheath that is die cut from nylon surfacing-net scrim that has a weight in the range from about 0.6 to about 1.5 ounces per square yard, and preferably has a weight of about 0.8 ounce per square yard. The fibers of the protective element 30D are considerably larger than those of the underlying microglass element 30C, and are desirably bonded to them.

Figure 7:
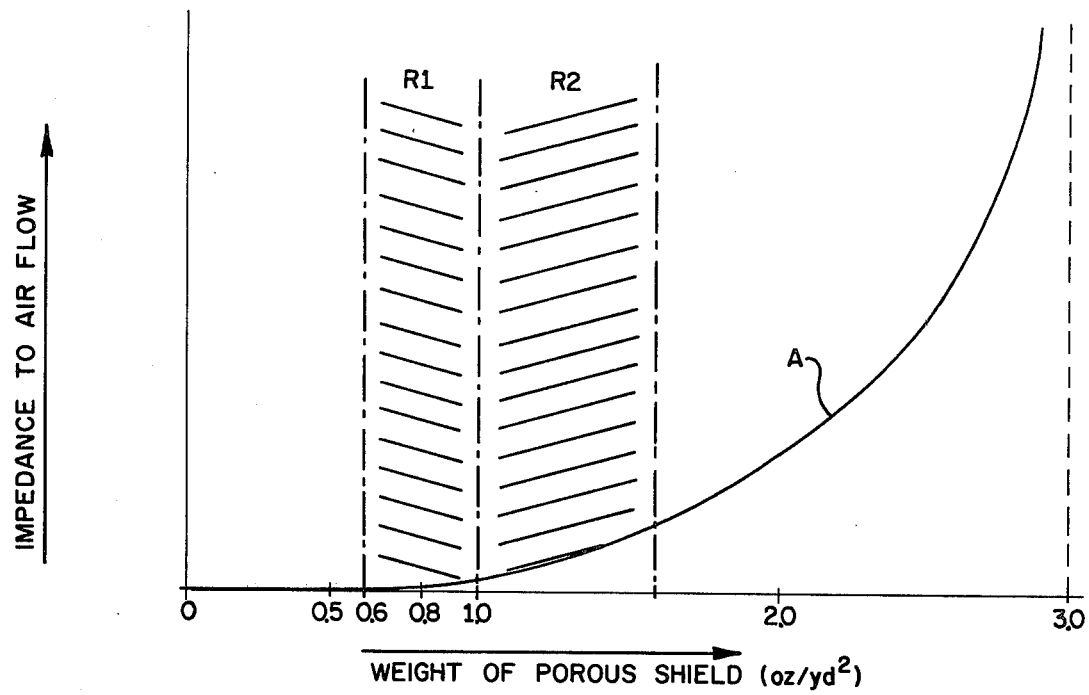
FIG. 7 is a graph illustrating the behavior of a filter protective shield in accordance with the invention.

The performance of the protective element 30D, when used in conjunction with a filter in accordance with the invention, is illustrated by graph A in FIG. 7. For weight values of the protective shield or element 30D below about 0.8 ounce per square yard it has been unexpectedly discovered that the shield 30D affords negligible resistance to the passage of air flow from the microglass element 30C. It is believed that there is complete clogging for weight values about 3.0 ounces per square yard, and that the knee of the curve A is at a weight value of about 2.0 ounces per square yard. It is believed that suitable reinforcement of the microglass element 30D, without undue air impedance is realized for protective shields in the weight range in the region R1 of the curve A from about 0.6 to about 1.0 ounces per square yard. A less porous shield in the weight range from about 1.0 to about 1.6 ounces per square yard in the region R2 may be employed under some conditions.

Figure 8:
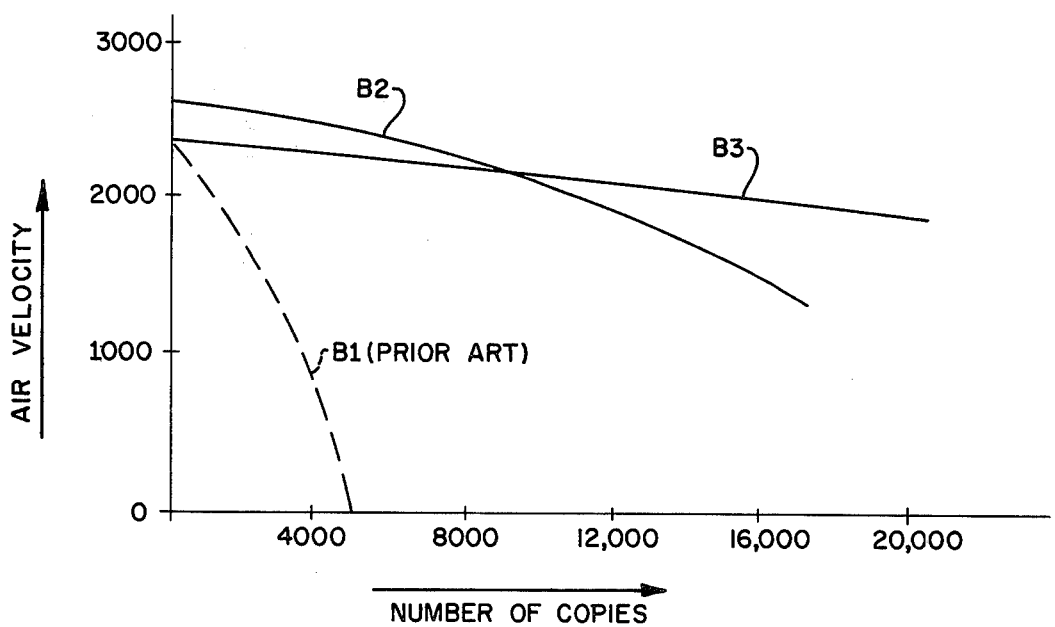
FIG. 8 is a set of graphs illustrating the performance with filter bags of the prior art.

The performance of various filter bags in a representative dry copier machine is illustrated by FIG. 8, showing how filter air flow is reduced as the number of copies increases.

Curve B1 applies to various filter bags of the prior art; Curve B2 applies to a bag with a first prefilter element 30A in accordance with the invention; while Curve B3 is for a bag with multi-elements 30A, 30B and 30C in accordance with the invention. The bags of curves B2 and B3 may be used with or without the protective shield 30D.

In the case of the prior bags of Curve B1, the filter air velocity diminishes to about zero, due to clogging, after about 5000 copies. By contrast, filter bags in accordance with the invention perform well beyond about 20,000 copies, as indicated by curves B2 and B3. There is substantially less degradation due to clogging exhibited by the bags of Curve B3 than by the bags of Curve B2, showing the improvement afforded by the construction of FIG. 5.

The overall porosity of bags in accordance with the invention is believed to range from 1 to 40 microns, with the first element 30A advantageously having a porosity ranging from about 25 to about 40 microns, the second element 30B advantageously having a range from about 10 to about 30 microns and the third element 30C advantageously having a range from about 1 to about 15 microns.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

We claim:

1. A filter medium comprising three elements, the first of which comprises a plurality of successive layers of different densities, the second of which is formed by fibers having different deniers; and the third of which is made up of glass fibers;

said first element having a porosity greater than that of said third element, and said second element having a porosity range between a value above the lowest porosity of said third element and below the highest porosity of said first element.

2. A filter medium as defined in claim 1 wherein said elements filter particles having a size range of from about 1 to 40 microns.

3. A copier filter medium as defined in claim 2 wherein the first element comprises microglass; the second element comprises polyester adjacent the microglass and the third element comprises fiberglass.

4. A filter medium in accordance with claim 1 wherein said first element has a porosity in the range from about 25 to about 40 microns, the second element has a porosity in the range from about 10 to about 30 microns and the third element has a porosity in the range from about 1 to about 15 microns.

5. A bag for filtering particulate matter comprising a filter medium forming the walls of said bag and a flexible porous protective shield separate from and surrounding said medium and having a greater porosity than that of said medium; said porous shield being of filamentous material having a weight below about 0.8 ounces per square yard.

6. A filter bag as defined in claim 5 wherein said porous shield is of non-woven filamentous material and said filter medium includes microglass fibers.

7. A filter bag as defined in claim 5 wherein said porous shield is of spun-bonded filamentous nylon.

8. A filter bag as defined in claim 5 wherein said porous shield is of spun-bonded filamentous polyester.

9. A copier filter bag as defined in claim 5 wherein said filter medium comprises multiple stages of filter material.

10. A filter bag as defined in claim 5 wherein said filter medium is formed by a plurality of different filter elements superimposed upon one another.

* * * * *